United States Patent
Lee et al.

(10) Patent No.: US 8,412,256 B2
(45) Date of Patent: Apr. 2, 2013

(54) INTER-CELL INTERFERENCE COORDINATION METHOD AND APPARATUS FOR WIRELESS COMMUNICATION SYSTEM

(75) Inventors: Neung Hyung Lee, Seongnam-si (KR); Sung Oh Kwon, Seoul (KR); Jong In Kim, Seongnam-si (KR); Ho Sun Youm, Seoul (KR); Kyung Chun Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 12/763,493

(22) Filed: Apr. 20, 2010

(65) Prior Publication Data

US 2010/0267408 A1 Oct. 21, 2010

(30) Foreign Application Priority Data

Apr. 20, 2009 (KR) .......................... 10-2009-0034343

(51) Int. Cl.
*H04B 7/00* (2006.01)
(52) U.S. Cl. ......... 455/522; 455/69; 455/70; 455/67.11; 455/63.1; 370/315; 370/316; 370/317; 370/318; 370/319

(58) Field of Classification Search .................. 455/522, 455/69–70, 561, 446–455; 370/318–320
See application file for complete search history.

(56) References Cited

U.S. PATENT DOCUMENTS

2011/0223929 A1 * 9/2011 Boudreau et al. .......... 455/452.1

* cited by examiner

*Primary Examiner* — Fayyaz Alam
(74) *Attorney, Agent, or Firm* — The Farrell Law Firm, P.C.

(57) ABSTRACT

An inter-cell interference coordination method and apparatus is provided for mitigating inter-cell interference in a wireless communication system by using interference coordination information exchanged among neighbor base stations. The method includes receiving, at a serving base station, power control messages transmitted by neighbor base stations, receiving incoming interference coordination messages transmitted by neighbor base stations, each message including interference indicators of resource blocks, allocating the resource blocks with transmission power per resource block to user equipments served by the base station based on the power control and interference coordination messages, generating outgoing interference coordination messages for the respective neighbor base stations based on the resource block allocation result, and transmitting the interference coordination messages to the neighbor base stations, respectively.

14 Claims, 15 Drawing Sheets

FRF 3 — 201

FFR (EXAMPLE 1) — 203

FFR (EXAMPLE 2) — 205

: PRB ALLOCATED TO CELL-EDGE CELL

: PRB ALLOCATED TO CELL-CENTER CELL (WITHOUT POWER LIMIT)

: PRB ALLOCATED TO CELL-CENTER CELL (WITH POWER LIMIT)

: NON-USE PRB

0 : PRB is not used or used under power limit

1 : PRB is used and RB is not vulnerable to interference

2 : PRB is used and PRB is vulnerable to interference

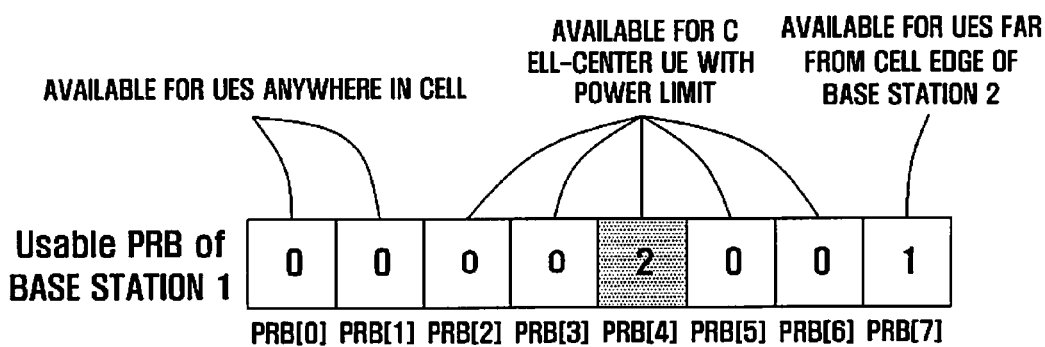

FIG. 7D

| DL HII to BASE STATION 2 | 1 | 2 | 0 | 0 | 0 | 0 | 0 | 1 |
|---|---|---|---|---|---|---|---|---|
| | PRB[0] | PRB[1] | PRB[2] | PRB[3] | PRB[4] | PRB[5] | PRB[6] | PRB[7] |

| DL HII to BASE STATION 3 | 1 | 1 | 0 | 0 | 0 | 0 | 0 | 2 |
|---|---|---|---|---|---|---|---|---|
| | PRB[0] | PRB[1] | PRB[2] | PRB[3] | PRB[4] | PRB[5] | PRB[6] | PRB[7] |

INTER-CELL INTERFERENCE COORDINATION METHOD AND APPARATUS FOR WIRELESS COMMUNICATION SYSTEM

PRIORITY

This application claims priority to an application filed with the Korean Intellectual Property Office on Apr. 20, 2009 and assigned Serial No. 10-2009-0034343, the contents of which are incorporated herein by reference.

BACKGROUND OF THE INVENTION

1. Field of the Invention

The present invention relates generally to wireless communications and, in particular, to an inter-cell interference coordination method and apparatus for mitigating inter-cell interference in a wireless communication system by using interference coordination information exchanged among neighbor base stations.

2. Description of the Related Art

In the $3^{RD}$ Generation Partnership Project (3GPP) Long Term Evolution (LTE) standard, a Relative Narrowband Transmit (TX) Power (RNTP) indication is defined for DownLink (DL) Inter-Cell Interference Coordination (ICIC). An RNTP message includes a plurality Information Elements (IEs) such as an RNTP Per Physical Resource Block (PRB), RNTP Threshold, Number Of Cell-specific Antenna Ports (P_B), and Physical Downlink Control CHannel (PDCCH) Interference Impact.

FIG. 1 illustrates the arrangement of RNTP Per PRB in a normal power control message for use in a conventional wireless communication system.

The RNTP Per PRB's have a value '0' or '1' and constitute a bitmap. The $i^{th}$ value of the bitmap corresponds to the $i^{th}$ PRB. The value '0' indicates transmit power not exceeding an RNTP threshold and the value '1' indicates transmit power exceeding the RNTP Threshold. Although the RNTP Per PRB is set to 1, this does not indicate that power is to be allocated greater than the RNTP Threshold. Furthermore, although the power less than the RNTP Threshold is allocated, this does not indicate that the RNTP Per PRB value changes immediately from 1 to 0. This is because the RNTP message is transmitted at a time interval of at least 100 ms and a PRB allocation policy is transmitted to neighbor cells during the interval.

Using the RNTP, it is possible to implement a Frequency Reuse Factor 3 (FRF 3) for fixedly allocating the frequency resource per cell and a Flexible Frequency Reuse (FFR) for improving the flexibility of the frequency resource allocation.

FIGS. 2 and 3 illustrate power control message transmission schemes used in the conventional wireless communication system. FIG. 2 illustrates conventional implementations of FRF 3 and FFR when the RNTP Threshold has a negative decibel (−dB) value. If the RNTP Threshold has a −dB value and the RNTP Per PRB is set to 0, then there is no power allocation and thus no transmission.

In the system using FRF 3 as denoted by reference numeral 201 of FIG. 2, the base station 1 uses only the PRB[0] and PRB[1] resource blocks, the base station allocates only the PRB[2] and PRB[3] resource blocks, and base station 3 uses only the PRB[4] and PRB[5] resource blocks.

Each base station can allocate the available resource blocks to User Equipments (UEs). In the system 201 using the FRF 3 scheme, each base station allocates one of the available resource blocks to a cell-center UE and the other resource block to a cell-edge UE.

In the system 203 using the FFR scheme, three of the six resource blocks are shared by the base stations 1 to 3, and the remaining three resource blocks are dedicated to the respective base stations. In this case, each base station can use four resource blocks by allocating the single dedicated resource block for the cell-edge UEs and the shared resource blocks for the cell-center UEs.

Although it is possible to adjust a resource block allocation rate of the number of resource blocks for the cell-edge UEs to the number of resource blocks for the cell-center UEs for balance purposes, the aforementioned resource allocation technique is basic in system 201.

In system 205 using another FFR scheme, four of the six resource blocks are shared by the base stations 1 to 3. This is a poor arrangement, because each of the base stations 2 and 3 is assigned a dedicated resource block respectively but the base station 1 is not assigned any dedicated resource block. This may occur in case each of the base stations 1 to 3 is not deployed in a cell of hexagonal formation and exists in a normal environment for determining the RNTP in a distributed manner.

FIG. 3 illustrates implementations of FRF 3 and FFR when the RNTP Threshold has a value that is not −dB. Unlike the systems in FIG. 2, if the RNTP Per PRB is set to 0 but does not exceed the RNTP Threshold, it is possible to allocate a resource block. In the system using FRF 3 as denoted by reference numeral 301, each base station allocates the resource blocks of which RNTP Per PRB is set to 1 for the cell-edge UEs and the resource blocks of which RNTP Per PRB is set to 1 the cell-center UEs. This is an actual FFR scheme. In the systems using FFR as denoted by reference numerals 303 and 305, each base station allocates the power less than the RNTP Threshold to the resource blocks of which RNTP Per PRB is set to 0.

When the power allocation per resource block is used and the base stations exchange the power control information, the dedicated resource blocks can be allocated unfairly as shown in the systems 205 of FIG. 2 and 305 of FIG. 3.

Also, when the multiple cells use a predetermined number of resource blocks in common as shown in the systems 203 of FIG. 2 and 303 of FIG. 3, it is difficult to coordinate the inter-cell interference for the shared resource blocks. Particularly, although the RNTP set to 1 for a resource block is transmitted, the resource block may not be used by any cell or may be used by all of the cells, since the decision whether to use the resource block is made by scheduler.

Since the resource block usage status is not reflected to the scheduling when using the RNTP message for resource block allocation, it is impossible to achieve dynamic inter-cell interference coordination at an interval shorter than 100 ms. Although the RNTP message may be transmitted more frequently and to reflect the scheduling result to determine the RNTP Per PRB values, the resource block allocation policy is rendered useless, resulting in failure of static ICIC during a long term interval.

SUMMARY OF THE INVENTION

In order to overcome the aforementioned problems of the prior art, the present invention provides an inter-cell interference coordination method for a wireless communication system that is capable of dynamically mitigating inter-cell interference.

Also, the present invention provides an inter-cell interference coordination method for a wireless communication that is capable of improving the inter-cell interference mitigation gain by reflecting the scheduling result of a base station on the UEs within the cell.

In accordance with the present invention, an inter-cell interference mitigation method for a wireless communication system includes receiving, at a serving base station, power control messages transmitted by neighbor base stations, receiving incoming interference coordination messages transmitted by neighbor base stations, each coordination message including interference indicators of resource blocks, allocating the resource blocks with transmission power per resource block to user equipments served by the base station based on the power control messages and interference coordination messages, generating outgoing interference coordination messages for the respective neighbor base stations based on the resource block allocation result, and transmitting the interference coordination messages to the neighbor base stations, respectively.

In accordance with the present invention, an inter-cell interference mitigation apparatus for a wireless communication system includes a message processor which receives incoming power control messages and interference coordination messages transmitted by neighbor base stations and transmits outgoing interference coordination messages to the neighbor base stations, an interference processor which extracts interference indicators from the incoming interference coordination messages, and a scheduler which allocates resource blocks to user equipments in a cell with transmission power per resource block based on the interference indicators and generates the outgoing interference coordination messages.

BRIEF DESCRIPTION OF THE DRAWINGS

The above and other objects, features and advantages of the present invention will be more apparent from the following detailed description in conjunction with the accompanying drawings, in which:

FIGS. 7A to 7D illustrate a DL HII message transmission principle for supporting the inter-cell interference coordination method according to an embodiment of the present invention;

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

In the present invention, a base station receives power allocation messages and interference coordination messages including information on the allocated resource blocks and inter-cell interference from neighbor base stations, allocates resource blocks and transmission power to the UEs within the cell in consideration of the information carried by the power allocation and interference coordination messages, generates an interference coordination message indicating interference probability with each neighbor base station in consideration of the scheduling, and transmit the interference coordination message to the corresponding neighbor base station.

The interference coordination message generation procedure includes analyzing the individual resource blocks and checking whether the resource blocks are in use, analyzing resource blocks in use, comparing the Reference Signal Received Power (RSRP) of a target cell with an RSRP threshold (RSRP_th), and generating the interference coordination message having a usage indicator set to "interference state" for the PRB of which RSRP greater than the RSRP_th and "use state" for the PRB of which RSRP is not greater than the RSRP_th.

In the scheduling procedure, the base station does not allocate, to the UEs within the cell, the resource blocks to which the interference coordination message indicates the interference state. That is, the base station allocates the dedicated resource blocks to both the cell-center and cell-edge UEs, the shared resource blocks to the UEs that are not located in the cell edges of the neighbor base stations, and the dedicated resource blocks of the neighbor cells to only the cell-center UEs, and does not allocate the resource block in the interference state.

Although the following description is directed to the Long Term Evolution (LTE) system, the present invention can be applied to other wireless communication systems supporting message exchange among the base stations.

Figure 1:
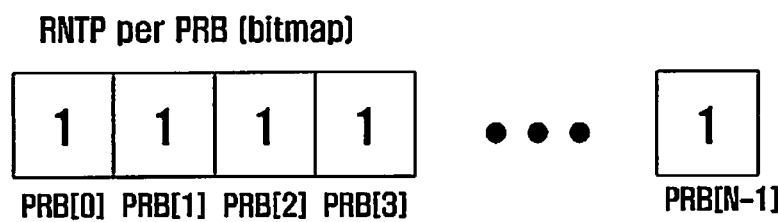
FIG. 1 illustrates the arrangement of RNTP Per PRB in a normal power control message for use in a conventional wireless communication system.
Figure 2:
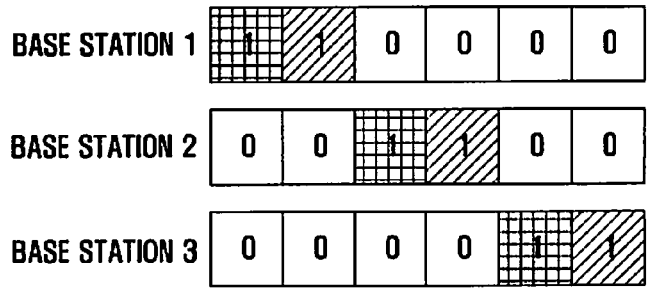
FIGS. 2 and 3 illustrate power control message transmission schemes used in the conventional wireless communication system.
Figure 2:
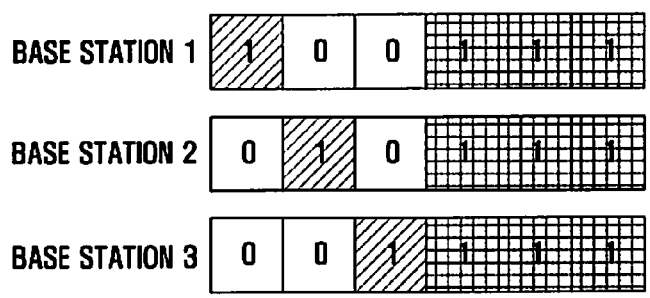
Figure 2:
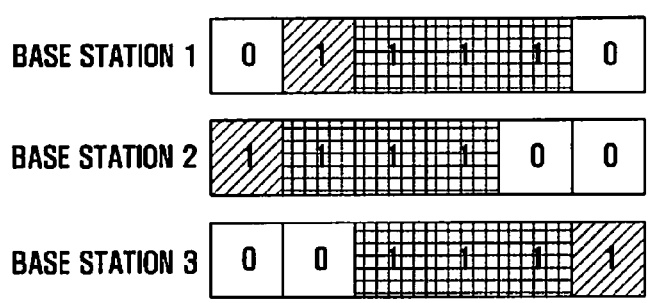
Figure 2:
Figure 2:
Figure 2:
Figure 2:
Figure 3:
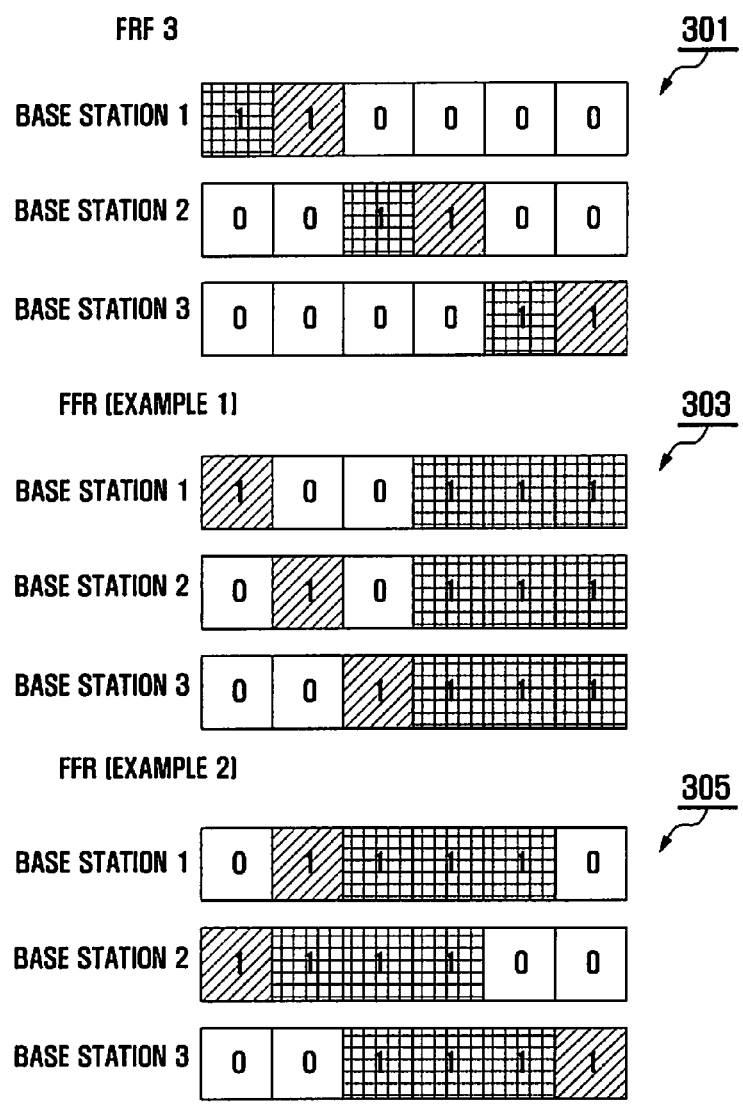
Figure 4A:
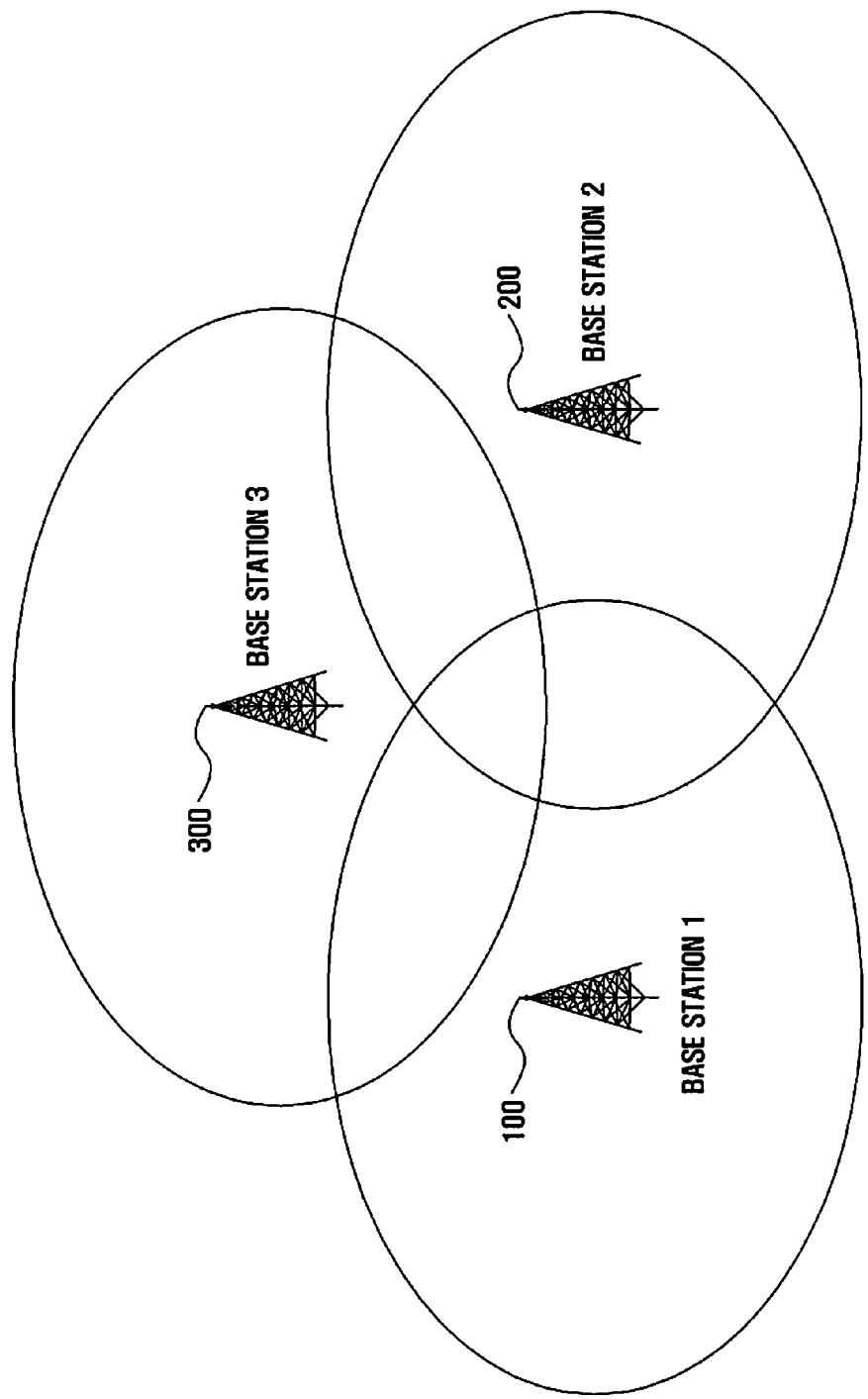
FIG. 4A illustrates a DL inter-cell interference coordination system to which the present invention is applied.
Figure 4B:
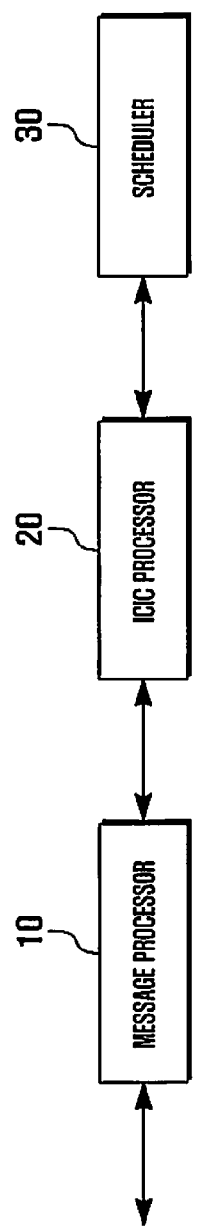
FIG. 4B illustrates a configuration of a base station of FIG. 4A.

FIG. 4A illustrates a downlink inter-cell interference coordination system to which the present invention is applied, and FIG. 4B illustrates a configuration of a base station of FIG. 4A.

The inter-cell interference coordination system includes at least two base stations and a plurality of UEs served by one of the base stations. Although a base station can have multiple cells identified by a unique cell identifier, the description is made under the assumption that each base station has a single cell, for purposes of conciseness.

Referring to FIG. 4A, the inter-cell interference coordination system includes three base stations 100, 200, and 300 that are directly interconnected by means of an inter-cell interface without involvement of a core network. According to the LTE standard, the inter-cell interface can be an X2 interface. Each of the base stations 100, 200, and 300 is configured according to the present invention as shown in FIG. 4B.

Specifically, each base station includes a message processor 10 for processing the messages exchanged with other base stations through the X2 interface, an ICIC processor for processing operations related to ICIC function, and a scheduler 30 for scheduling resources based on the information collected from the UEs and the neighbor base stations.

The message processor 10 is configured to receive the RNTP and DL HII messages transmitted by neighbor base stations, and to transmit the RNTP message and HII message generated by the scheduler 30 to the neighbor base stations. The HII message processed by the message processor 10 is transferred to the ICIC processor 20, which extracts power allocation and interference coordination information for use in the PRB and power allocations from the received RNTP messages and DL HII messages by a specific algorithm and provides the extracted information to the scheduler 30. The scheduler 30 allocates the PRBs to the UEs within the cell and assigns power per PRB based on the information provided by the ICIC processor 20. The scheduler 30 also generates the RNTP messages and DL HII messages using location information on the UEs. The RNTP and DL HII messages are transferred to the message processor 10, which transmits the RNTP and DL HII messages to the neighbor base station through the inter-cell interface (i.e. X2 interface).

The message processor 10 receives the RNTP and DL HII messages transmitted by the neighbor base stations and transmits the RNTP and DL HII messages generated by the scheduler 30 to the neighbor base station. The ICIC processor 20 converts the RNTP and DL HII messages to the power allocation and interference coordination information for use in PRB and power allocations. The scheduler 30 allocates available PRBs and power to the UEs in its cell based on the power allocation and interference coordination information. The scheduler 30 also generates the ICIC message indicating the interference probability with the neighbor base station as a result of its scheduling and transmits the ICIC message to the neighbor base station by means of the message processor 20.

At this time, the scheduler 30 analyzes the individual PRBs, sets a usage indicator to "use state" for the PRB which is in use and "non-use" for the PRB which is not in use, compares the RSRP of the signal received on the PRB in use state with the RSRP_th, and generates the ICIC message having the usage indicator set to "interference state" for the PRB in use state if the RSRP is greater than or equal to the RSRP_th and "use state" for the PRB in use state if the RSRP is less than the RSRP_th.

The scheduler 30 does not allocate the PRB of which usage indicator is set to "interference state". That is, the scheduler 300 allocates its dedicated PRBs for the UEs in its cell, the shared PRBs to the UEs that are not located in the cell edges of the neighbor base stations, and the dedicated PRBs of the neighbor base stations to the cell-center UEs, while excluding the allocation of the PRBs of which usage indicator is set to "interference state".

The inter-cell interference coordination method of the present invention is disclosed for dynamically mitigating the inter-cell interference at an interval shorter than 100 ms under the assumption that the RNTP message is transmitted at an interval longer than 100 ms for static ICIC. For this purpose, a DL HII message is introduced in the present invention. The inter-cell interference coordination method is devised in consideration of the persistent scheduling service in which the same resource block is periodically allocated to a UE for a predetermined duration.

Figure 5:
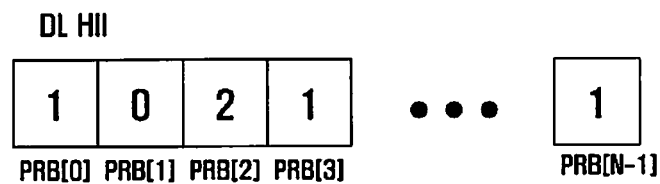
FIG. 5 illustrates a transmission format of a DownLink High Interference Indication (DL HII) message according to an embodiment of the present invention.

FIG. 5 illustrates a transmission format of a DL HII message according to the present invention. An RNTP message includes RNTP Per PRB and RNTP Threshold information in the form of a bitmap mapping the resource blocks.

Similar to the RNTP message, the DL HII message according to the present invention is formed as a bitmap of values indicating the usage states (non-use state, use state, and interference state) of the corresponding PRBs. The following description is made under the assumption that the value "0" indicates the non-use state, "1" indicates the use state, and "2" indicates the interference state. In FIG. 5, N resource blocks are depicted and it is assumed that the PRB[0] to PRB[3] and PRB[N−1] have the values "1", "0", "2", and "1" respectively. If the usage state value of a resource block is set to "0", this indicates that the resource block is not in use or is used with the power below a power limit, which can be a threshold of the RNTP of the RNTP message or a separate value.

In FIG. 5, the usage state value of the resource block set to "1" indicates that the corresponding resource block is in use with invulnerability to the interference. If the UE allocated the resource block is at the cell center or a cell edge far from the target cell of the DL HII message, the DL HII of the corresponding resource block is set to 1.

Each base station transmits the DL HII message to a cell-specific manner rather than transmitting the same DL HII message to the neighbor cells. That is, the DL HII messages are generated for the respective target cells with different information values.

Figure 6A:
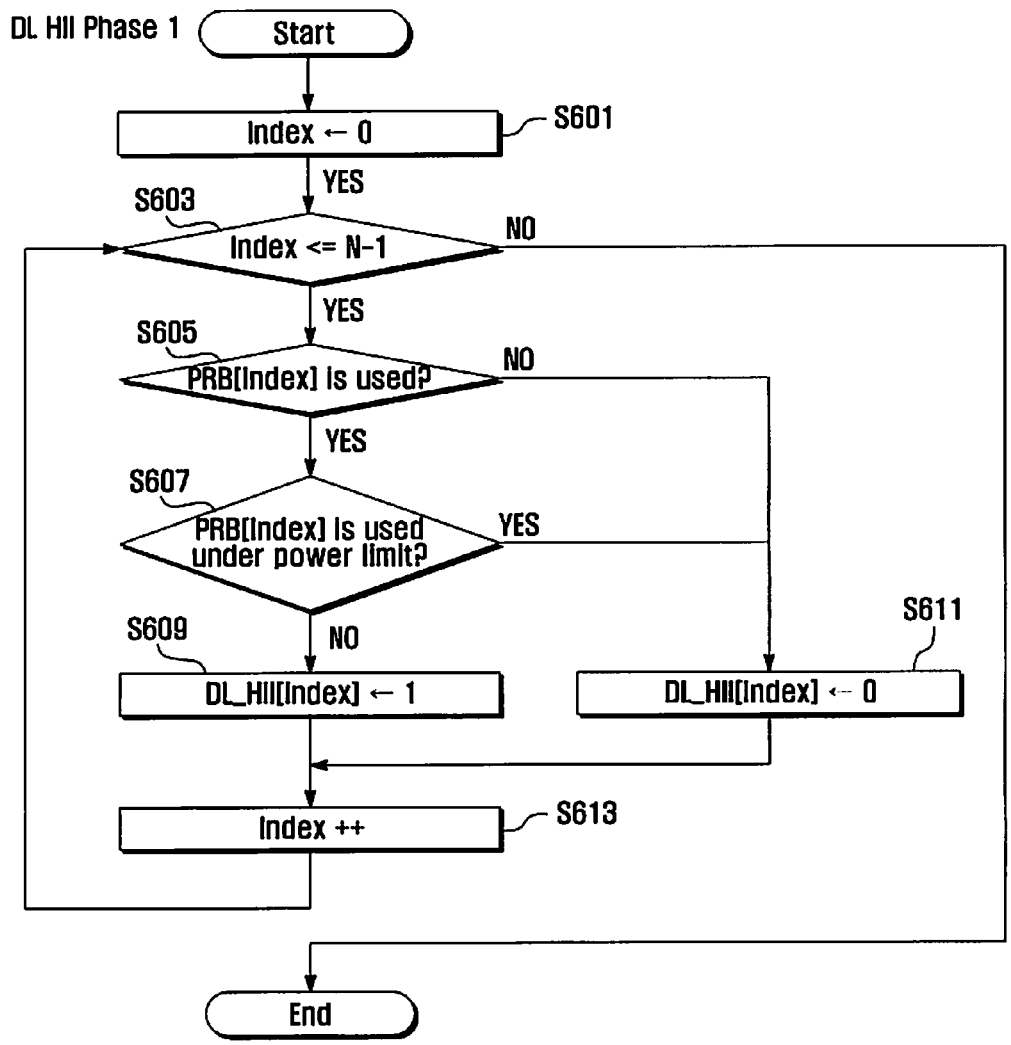
FIGS. 6A and 6B illustrate a DL HII message generation procedure of an inter-cell interference coordination method according to an embodiment of the present invention.
Figure 6B:
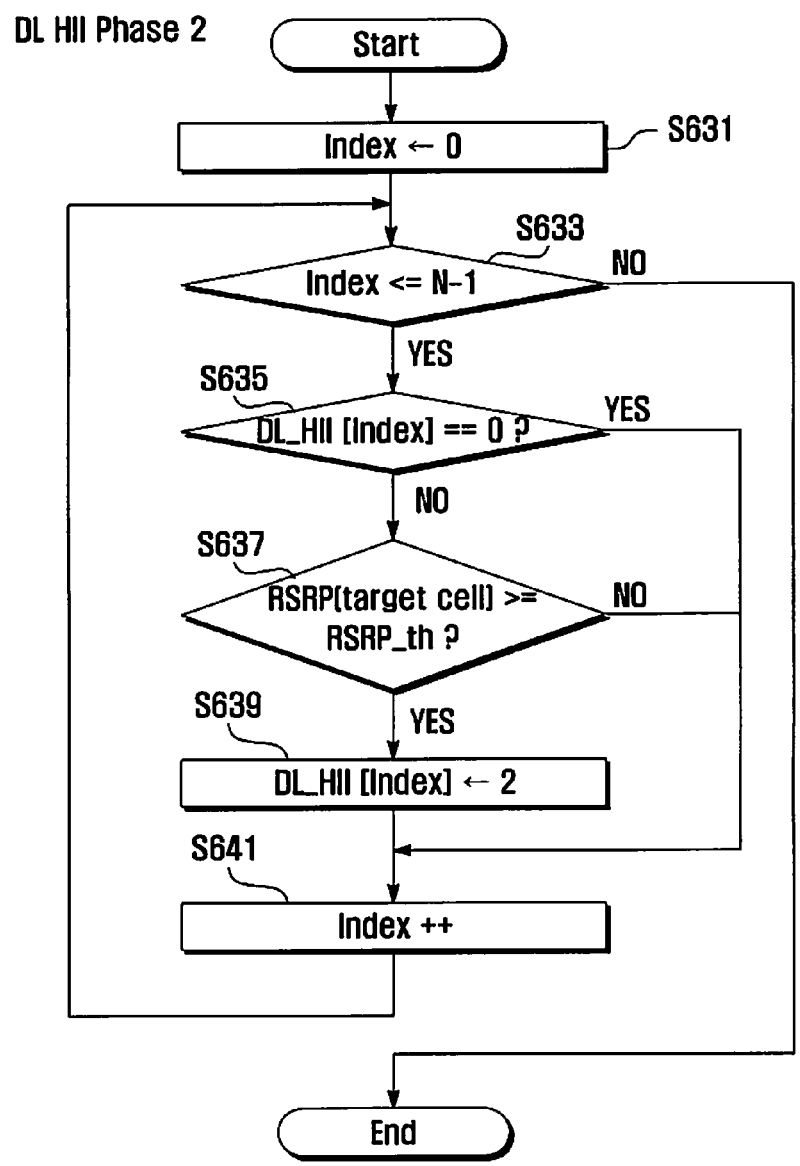

FIGS. 6A and 6B illustrate a DL HII message generation procedure of an inter-cell interference coordination method according to an embodiment of the present invention. The DL HII message generation procedure is composed of a common DL HII phase and a cell-specific DL HII phase. In the common DL HII phase, the DL HII is set to "0" for the power less than the power limit or "1" for the power not less than the power limit. FIG. 6A illustrates the steps of the common DL HII phase, and FIG. 6B illustrates the steps of the cell-specific DL HII phase.

Referring to FIG. 6A, the base station generates a DL HII message for N PRBs at steps S601, S603, and S613. That is, the base station initializes the index for PRB to 0 at step S601 and increments the index by 1 at step S613. Thereafter, the base station determines whether the index is equal to or less than N−1 to generate a DL HII message for N PRBs at step S603. Also, the base station generates the DL HII messages for the respective PRBs indexed by the indices from 0 to N−1 at steps S605 to S611.

In detail, the base station determines whether the current PRB is in use at step S605. If the PRB is in use, the base station determines whether the current PRB is in use with the power less than the power limit at step S607. If the current PRB is in use with the power greater than or equal to the power limit, the base station sets the DL HII of the PRB to "1" at step S609. Otherwise, if the current PRB is in use with the power less the power limit, the base station sets the DL HII of the PRB to "0" at step S611.

After setting the DL HII of the current PRB, the base station increments the PRB index by 1 and returns the process to step S603. If it is determined that the current PRB is not the last PRB, the base station repeats steps S605 to S611. If it is determined that the current PRB is the last PRB at step S603, the base station ends the common DL HII phase and initiates the cell-specific DL HII phase of FIG. 6B.

In the first stage, if the PRB is not used or if the PRB is in use but its power is less than the power limit, the base station sets the DL HII of the PRB to "0". If the power of the PRB in use is equal to or greater than the power limit, the base station sets the DL HII of the PRB to "1".

That is, in the first DL HII phase, the base station analyzes the individual PRBs and sets the DL HII of each PRB in use to "use state" or "non-use state".

In the second DL HII phase, the base stations analyzes the PRBs in use state, compares the RSRP of the target cell for each PRB in use with the RSRP_th, and resets the DL HII for the PRB to "interference state" if the RSRP of the target cell on the PRB is greater than or equal to the RSRP_th and maintains the DL HII as the "use state" if the RSRP of the target cell on the PRB is less than the RSRP_th.

In the second DL HII phase following the first DL HII phase, the base station selects a target cell and determines whether to reset the use state ("1") of each PRB in use to interference state ("1") or maintains the use state ("1"). FIG. 6B illustrates how to determine the state of the PRBs in use for generating the DL HII message. The DL HII message is generated in neighbor cell-specific manner.

Referring to FIGS. 6A and 6B, the base station generates a DL HII message for N PRBs at steps S631, S600, and S641. That is, the base station initializes index of PRBs for PRB to 0 at step S601 and increments the index by 1 at step S641. After incrementing the index by 1, the base station determines whether the index is equal to or less than N−1 to generate a DL HII message for N PRBs at step S633. The base station generates the target cell-specific DL HII messages for the PRBs of which usage state values are set to "1" among the $0^{th}$ to $(N-1)^{th}$ PRBs at steps S635 to S639.

In detail, the base station determines whether the DL HII of the current PRB is set to "0" (S635). If the DL HII of the current PRB is set to 0, the base station returns the process to step S633 and, otherwise, proceeds to step S637. If it is determined that the DL HII of the current PRB is set to 0, this indicates that the PRB is not in use or is used with the power less than the power limit. In this case, the base station skips the DL HII reset for the PRB. That is, if the DL HII of the current PRB is set to 0, the DL HII setting is maintained.

Otherwise, if it is determined that the DL HII of the current PRB is set to 1 at step 635, the base station determines whether the RSRP of the target cell (target base station) on the PRB is greater than or equal to the RSRP_th at step S637. Here, the target cell is the cell to which the DL HII message is transmitted. The UEs measure the RSRP of the neighbor base station and report the measurement results to their respective serving base stations. The parameters for the UE measurement of the RSRP_th of the neighbor base stations are provided by the serving base station. The serving base station provides the UEs with the information on the RSRP report interval or event, and the UEs measures the RSRP of the neighbor base stations and reports the measurement results to the serving base station. For example, the UE can be configured to report the RSRP of a neighbor base station to the serving base stations when the RSRP of the neighbor base station is greater than or equal to the RSRP_th. Also, the UE can be configured to report the RSRPs of the neighbor base stations to the serving base station at a predetermined interval.

The base station compares the RSRP of the target cell that is reported by the UE with the RSRP_th and determines whether the RSRP of the target cell is greater than or equal to the RSRP_th at step S637. If the RSRP of the target cell is greater than the RSRP_th, this indicates that the signal transmitted by the target cell is received with relatively high power, and thus it can be interpreted that the transmission on the corresponding PRB is vulnerable to interference. If it is determined that the RSRP of the target cell is greater than or equal to the RSRP_th at step S637, the base station resets the DL HII of the current PRB to 2 for indicating the vulnerability to the interference at step S639.

As described above, the base station compares the RSRP of a selected target cell on the PRBs in use with a predetermined RSRP_th and resets the DL HII of the PRBs on which the RSRP of the target cell is greater than or equal to the RSRP_th to 2 for indicating the vulnerability to the interference. If the RSRP of the target cell on the PRB is less than the RSRP_th, however, the base station maintains the DL HII of the PRB as it was, i.e. 1.

After resetting the DL HII of the current PRB through steps S635, S637, and S639, the base station increments the PRB index by 1 and repeats steps S633 to S641 until the last PRB is detected. If it is determined that the current PRB is the last PRB at step S633, the base station ends the second DL HII phase.

In the second DL HII phase, if the DL HII of a PRB is set to 0, the base station maintains the DL HII setting of the PRB. Otherwise, if the DL HII of a PRB is set to 1, the base station determines whether the RSRP of the target cell on the PRB is greater than or equal to the RSRP_th and resets the DL HII of the PRB on which the RSRP of the target cell is greater than the RSRP_th to 2. The DL HII of the PRB on which the RSRP of the target cell is less than the RSRP_th is maintained as 1.

FIGS. 7A to 7D illustrate a DL HII message transmission principle for supporting the inter-cell interference coordination method according to an embodiment of the present invention.

FIG. 7A illustrates structures of RNTP messages of the respective base stations. As shown in FIG. 7A, each of the three base stations uses two dedicated PRBs among the 8 PRBs (PRB[0] and PRB[1] for the base station 1, PRB[2] and PRB[3] for the base station 2, and PRB[4] and PRB[5] for the base station 3 and shares the remaining two PRBs (PRB[6] and PRB[7]). The dedicated PRBs can be allocated for the UEs in the cell of each base station and the shared PRBs are used in common by all the base stations. In the embodiment of FIG. 7A, it is preferred that each base station allocates the dedicated to the UEs within its cell (effective to the cell-edge UEs), the shared PRBs to the UEs that are not located in the cell edge of the base station using the same PRBs, and the dedicated PRBs of other base stations to the UEs to the cell-center UEs. In FIG. 7A, it is assumed that base station 2 experiences a relatively high traffic load while base station 3 experiences a relatively low traffic load. That is, base station 2 accommodates a large number of UEs, and base station 3 accommodates a relatively small number of UEs.

FIG. 7B illustrates DL HII messages transmitted from base stations 2 and 3 to base station 1. As shown, base station 2 transmits the DL HII message having DL HII values set to 1 for PRB[2] and PRB[7], 2 for PRB[3] and PRB[6] set, and 0 for the remaining PRBs. Also, base station 3 transmits the DL HII message having DL HII values set to 1 for PRB[4] and 0 for the remaining PRBs.

Since the base station 2 experiences a high traffic load, it uses the shared PRB[6] and PRB[7] as well as its dedicated PRBs (PRB[2] and PRB[3]). Among DL HIIs of the shared PRBs used by base station 2, the DL HIIs of PRB[6] is set to 2, which indicates that the RSRP reported by the UE using the PRB[6] is greater than or equal to the RSRP_th. Base station 3 uses only one PRB, i.e. the PRB[4] of its two dedicated PRBs, since it is experiencing a low traffic load.

Base station 1 performs transmission resource scheduling on the UEs within its cell based on the DL HII messages received from the neighbor base stations.

FIG. 7C illustrates the DL HII-based scheduling principle for the inter-cell interference coordination method according to an exemplary embodiment of the present invention.

Referring to FIG. 7C, base station 1 can allocate the PRB [0] and PRB[1] to the UEs located anywhere in its cell, since the PRB[0] and PRB[1] are its' dedicated PRBs. In the meantime, since the PRB[2], PRB[3], PRB[4], and PRB[5] are the dedicated PRBs of base station 2 and 3, these PRBs must be used with a power limit and thus are allocated to the cell-center UEs. Although the PRB[6] is a shared PRB, since base station 2 has transmitted the DL HII of the PRB[6] set to 2, base station 1 must use the PRB[6] with the power limit.

In an embodiment of the present invention, the base station is configured such that, if at least one neighbor base station sends the DL HII set to 2 for a PRB, the PRB cannot be allocated. However, the base station can be configured to allocate the PRB indicated by the DL HII set to 2 to the cell-center UE with the power limit. That is, if the DL HII of a PRB is set to 2, the base station can allocate the PRB to a cell-center UE with the power limit. The base station can be configured to exclude the use of a PRB only when a number of neighbor base stations transmitted the DL HII set to 2 for the PRB is greater than or equal to a predetermined value. Base station 1 can use the PRB[7] but allocates PRB[7] to the UEs that are not in the cell edge of base station 2, since the PRB[7] is already used by base station 2. The base station can be configured to exclude the use of the shared PRB when at least one neighbor base station has transmitted the DL HII set to 1 for the PRB.

In FIG. 7C, base station 1 allocates the PRB[0], PRB[1] and PRB[7] to the UEs within its cell, particularly the PRB[7] to the UE that is not located in the cell edges of base stations 1 and 2. Assuming that the PRB[1] is allocated to the UE near base station 2 and the PRB[7] is allocated to the UE near base station 3, base station 1 generates the DL HII messages for the individual base stations 2 and 3 and transmits the DL HII messages to base stations 2 and 3, respectively.

FIG. 7D illustrates the DL HII messages transmitted from base station 1 to base stations 2 and 3.

Base station 1 sets the DL HII values of the PRB[0], PRB[1], and PRB[7] to 1 and the DL HII values of the remaining PRBs to 0 according to the first DL HII phase of FIG. 6A. Next, base station 1 performs the steps of the second DL HII phase for the neighbor base stations (here, base stations 2 and 3) and resets the DL HII values of the PRBs that are determined as vulnerable to the interference to 2. Accordingly, the DL HII value of the PRB[1] in the DL HII message to be transmitted to base station 2 and the DL HII value of the PRB[7] in the DL HII message to be transmitted to base station 3 are set to 2.

The DL HII messages generated as described above are transmitted to their corresponding base stations, and the base stations that received the DL HII messages (here, base stations 2 and 3) perform scheduling to allocate resources to the UEs within their cells in the same manner as base station 1 with the PRB-specific power control, resulting in a mitigation of inter-cell interference.

As described above, each base station performs scheduling based on the information acquired from the DL HII messages transmitted by the adjacent base stations, resulting in the mitigation of inter-cell interference.

Figure 8A:
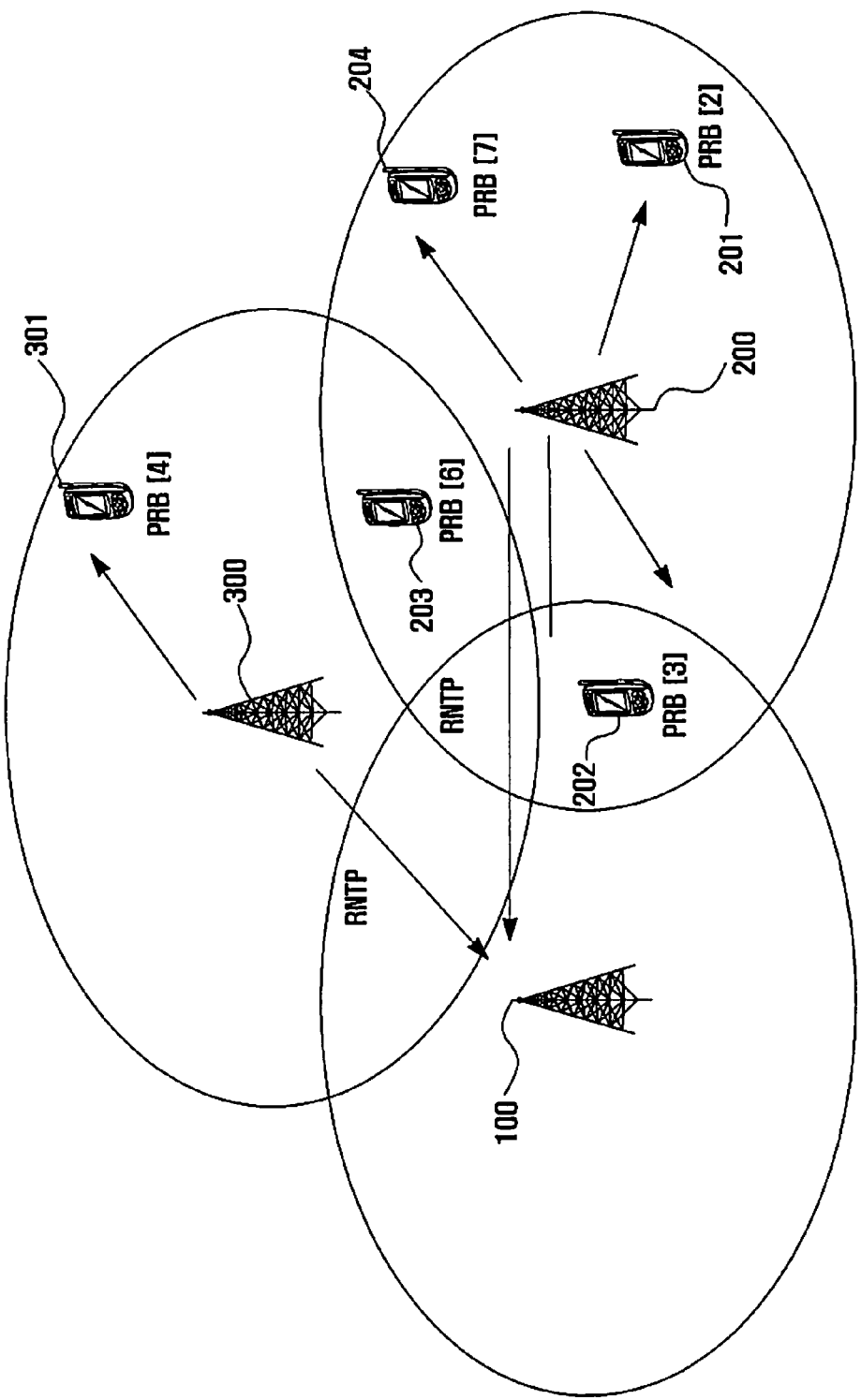
FIGS. 8A to 8D illustrate operations of base stations and UEs in the inter-cell interference coordination system according to embodiments of the present invention.
Figure 8B:
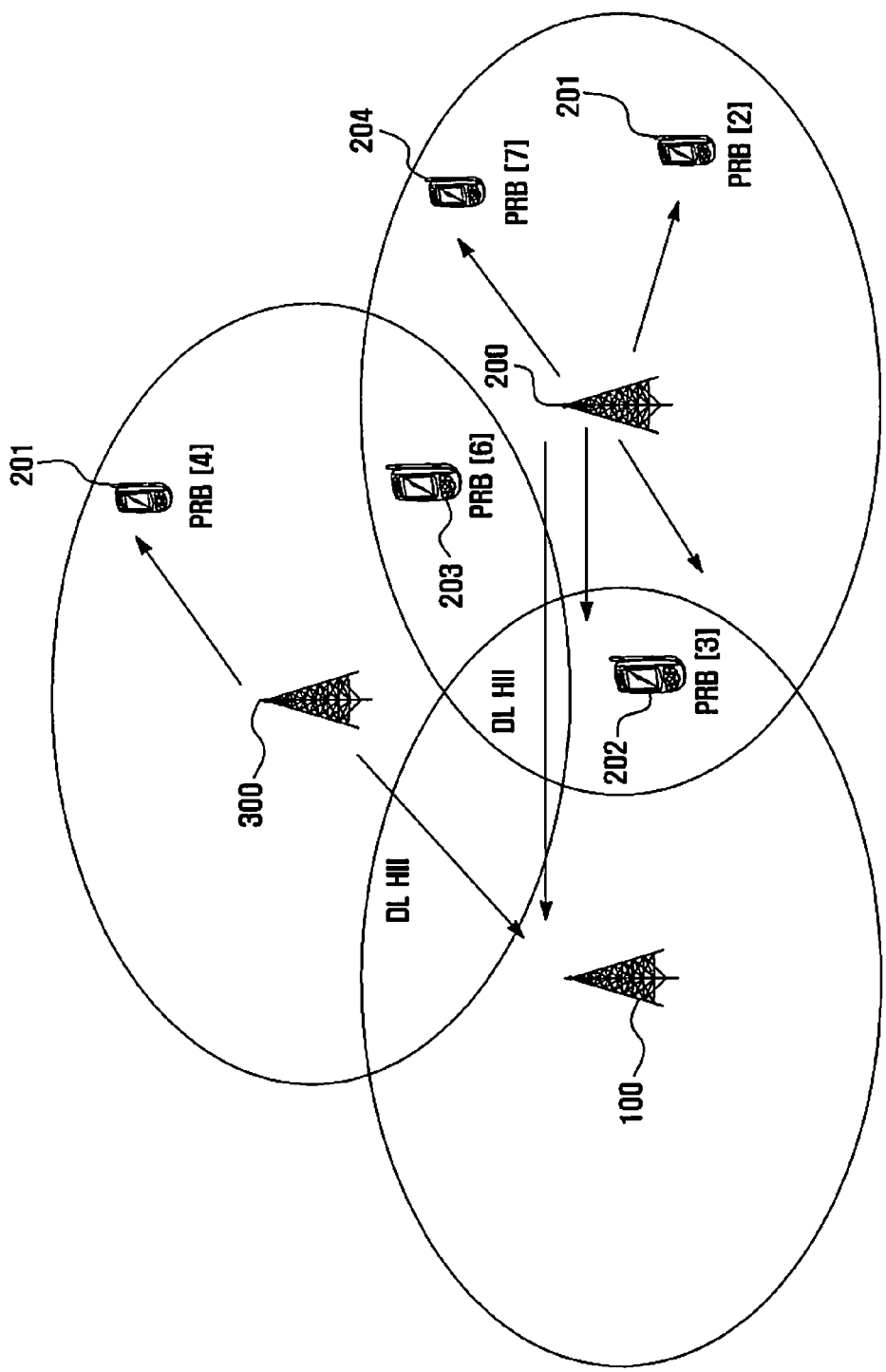
Figure 8C:
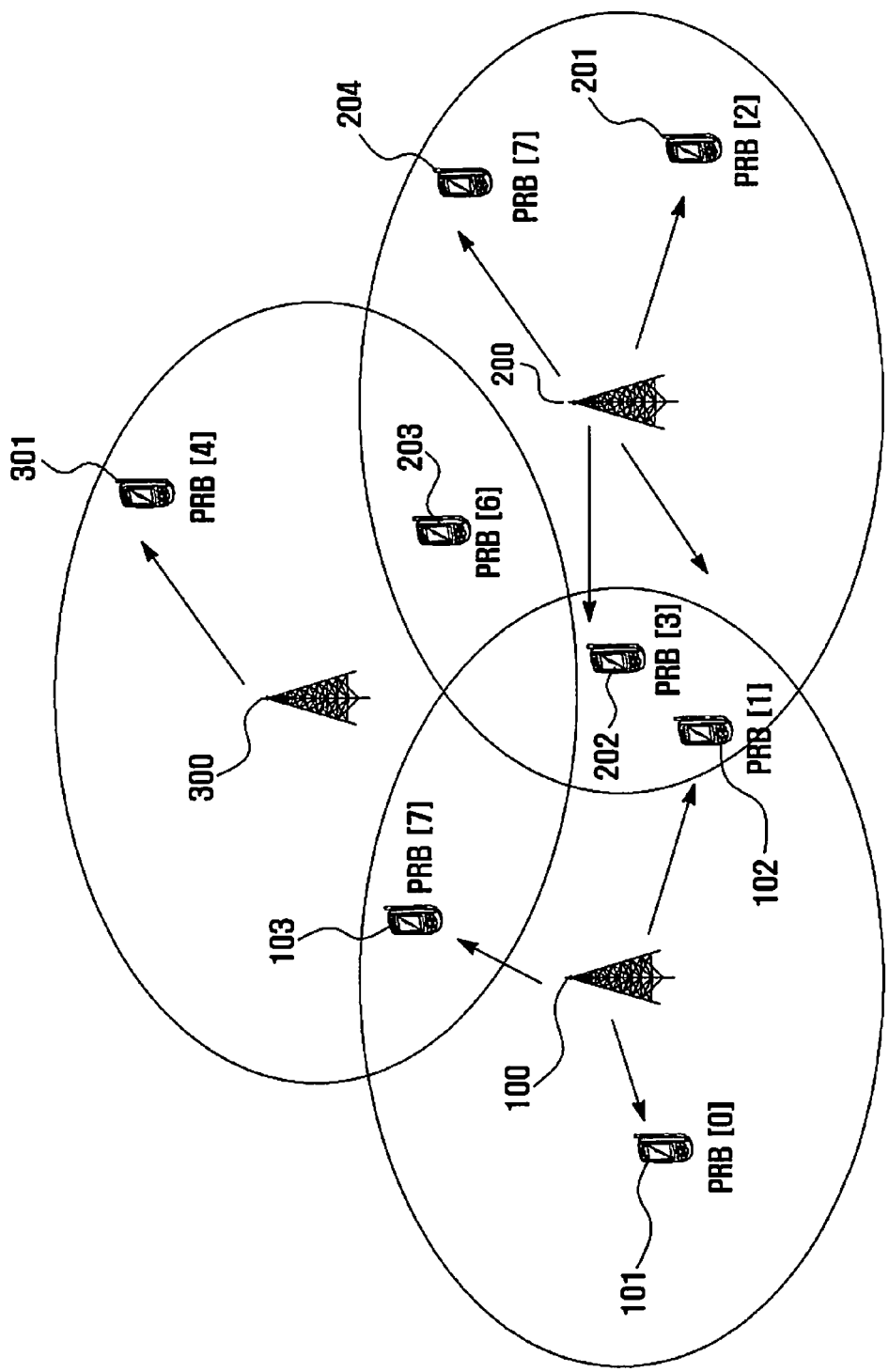
Figure 8D:
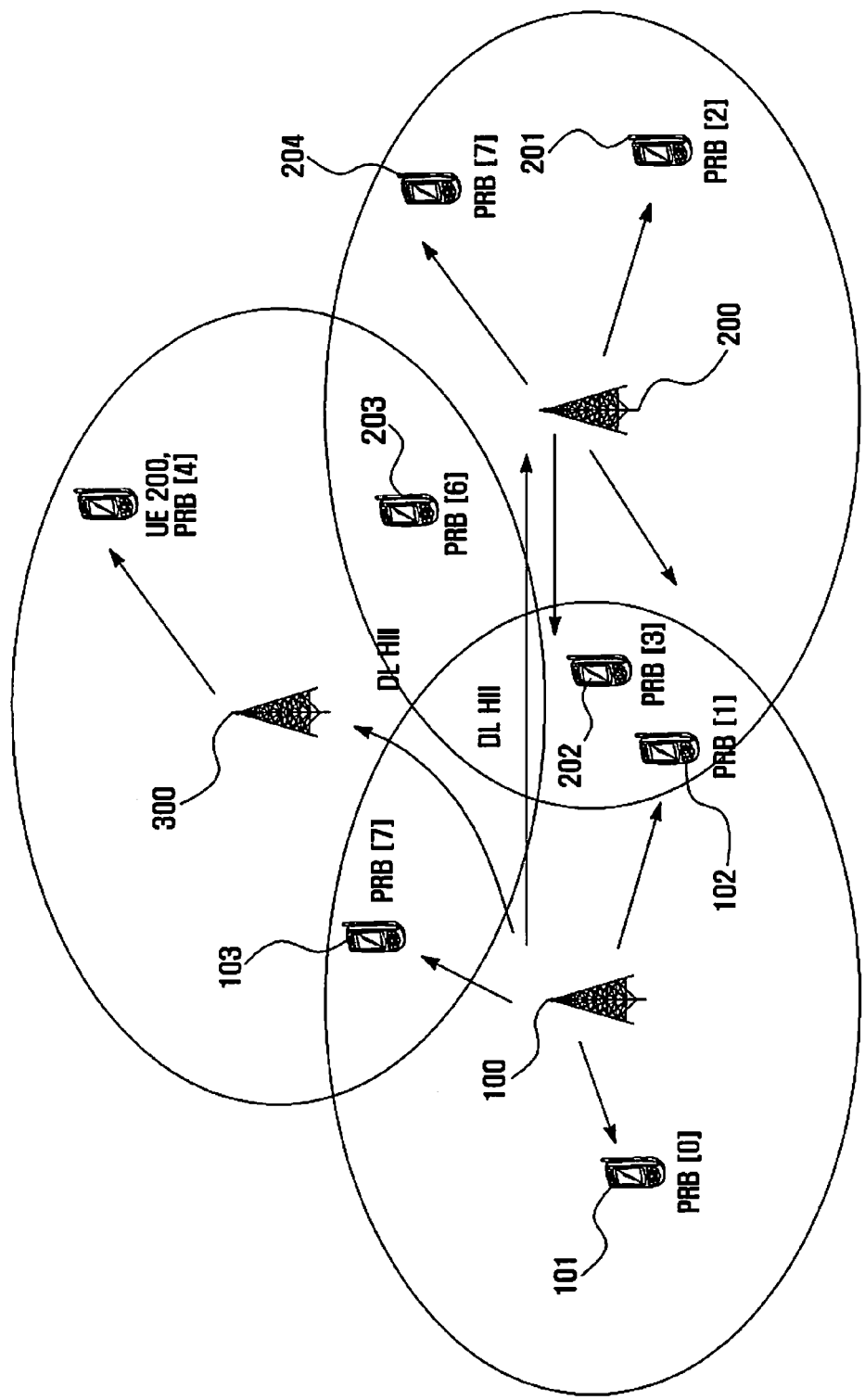
Figure 9:
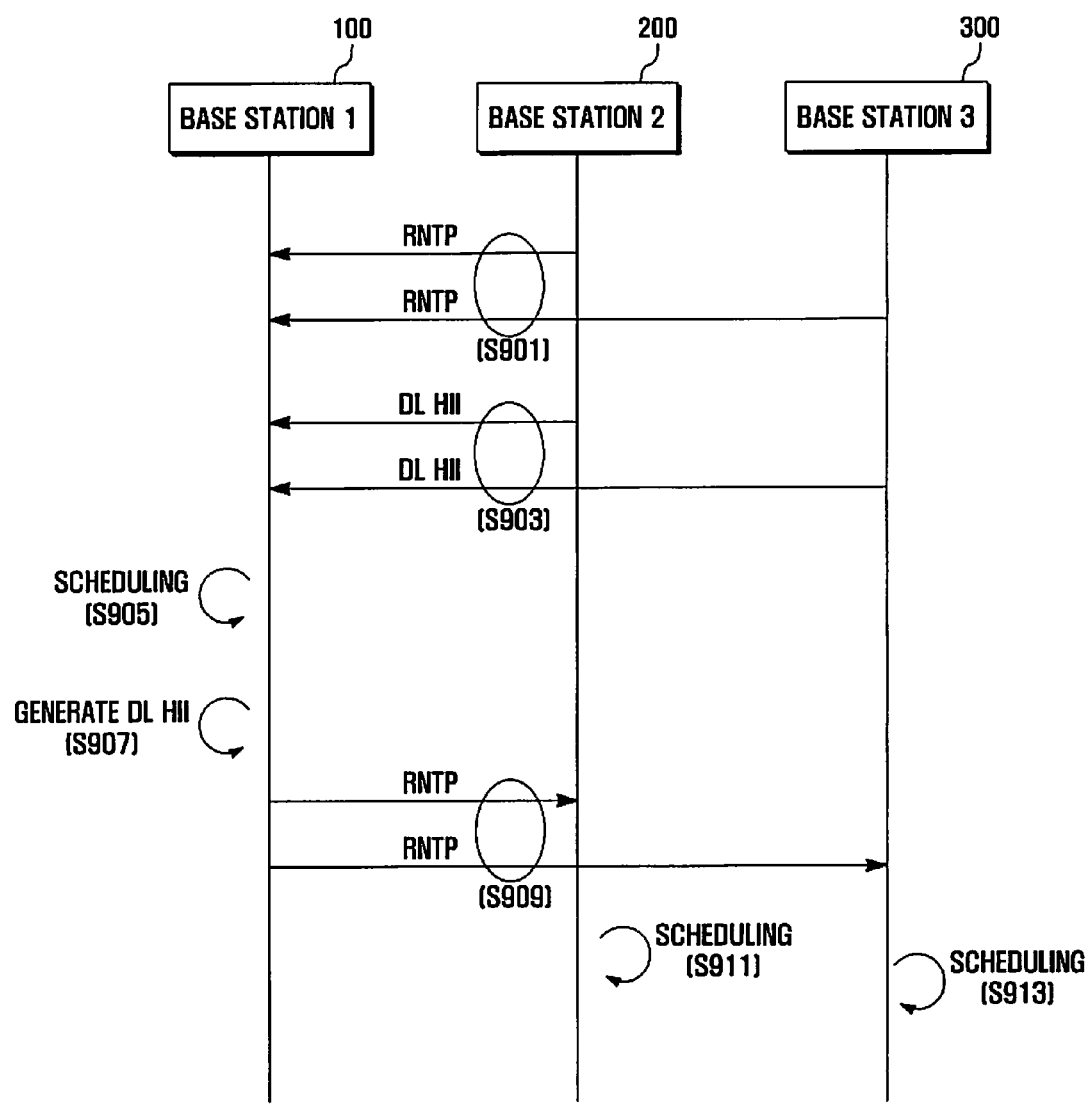
FIG. 9 illustrates operations of the base stations of the inter-cell interference coordination system.

FIGS. 8A to 8D illustrate operations of base stations and UEs in the inter-cell interference coordination system according to embodiments of the present invention, and FIG. 9 illustrates operations of the base stations of the inter-cell interference coordination system.

Referring to FIGS. 8A to 8D, three base stations are neighboring each other, and each base station serves at least one UE in its cell. The base station 200 serves the UEs 201, 202, 203, and 204 with the allocation of PRB[2], PRB[3], PRB[6], and PRB[7], respectively. Particularly, the UEs 202 and 203 are located at the cell edge of base stations 100 and 300. Base station 300 serves the UE 301 with the allocation of PRB[4].

Referring to FIG. 9, the base station 100 receives RNTP messages from base stations 200 and 300 (S901). FIG. 8A illustrates the situation in which the base station 100 is receiving the RNTP messages transmitted by base stations 200 and 300. It is assumed that the RNTP messages transmitted by base stations 200 and 300 are formatted as shown in FIG. 7A. As aforementioned, base station 200 allocates PRB[2] to the UE 201, PRB[3] to the UE 202, PRB[6] to the UE 203, and PRB[7] to the UE 204, and base station 300 allocates PRB[4] to the UE 301.

After the receipt of the RNTP messages, base station 100 receives the DL HII messages transmitted by base stations 200 and 300 (S903). FIG. 8B illustrates the situation in which base station 100 is receiving the DL HII messages transmitted by base stations 200 and 300. It is assumed that the DL HII messages transmitted by base stations 200 and 300 are formatted as shown in FIG. 7B.

Base station 200 allocates PRB[2], PRB[3], PRB[6], and PRB[7] to the respective UEs 201, 202, 203, and 204, and sets the DL HII values of the PRB[2], PRB[3], PRB[6], and PRB[7] to "1" in the RNTP message as described with reference to FIGS. 6A and 6B. Returning to FIG. 8B, since UEs 202 and 203 served by base station 200 are located at cell edges of base stations 100 and 200, these UEs are vulnerable to interference. Meanwhile, UEs 202 and 203 are respectively allocated PRB[3] and PRB[6] by base station 200. Accordingly, base station 200 resets the DL HII values of PRB[3] and PRB[6] to "2" in the DL HII message to be transmitted to base station 100.

Base station 3 serves the UE 301 with the allocation of PRB[4] which is the dedicated resource block of base station 300, and UE 301 is not located at a position invulnerable to the interference from base station 100. Accordingly, base station 300 sets the DL HII value of the PRB[4] to "1" in the DL HII message to be transmitted to base station 100.

The RNTP message is transmitted at a long-term interval, and the DL HII message is transmitted at a short-term interval. Preferably, the long-term interval is longer than 100 ms, and the short-term interval is less than 100 ms.

Once the DL HII messages transmitted at a short term interval are received after the receipt of the RNTP messages transmitted at long term intervals, base station 100 can perform scheduling based on the DL HII values contained in the received DL HII messages.

As aforementioned, base station 100 can use PRB[0] and PRB[1] dedicatedly for the UEs within its cell and share PRB[6] and PRB[7] with neighbor base stations. Referring to the RNTP message of base station 100 and the DL HII messages transmitted from base station 200 and 300 to base station 100, base station 100 can allocate its dedicated PRB [0] and PRB[1] to the UEs located anywhere in its cell. Base station 100 also can allocate the PRB[2], PRB[3], PRB[4], and PRB[5] dedicated to the neighbor base stations (i.e. base stations 200 and 300) to the cell-center UEs with the power limit.

Base station 100 also can allocate the PRB[6] and PRB[7] used in common with neighbor base stations to the UEs with reference to the DL HII messages received from the neighbor base stations. That is, since the DL HII value of PRB[6] in the DL HII message received from base station 200 is set to "2", it is preferred that base station 100 allocates the PRB[6] for the cell-center UEs with the power limit. As to PRB[7] of which DL HII value is set to "1" in the DL HII message received from base station 200, it is preferred that e base station 100 allocates PRB[7] for the UEs far from the cell edge of base station 200.

As described above, base station 100 performs transmission resource scheduling based on the DL HII messages transmitted by its neighbor base stations (S905). It is assumed that base station 100 has allocated the resource blocks as shown in FIG. 8C as a result of the DL HII-based scheduling. That is, base station 100 allocates the PRB[0], PRB[1], and PRB[7] to the respective UEs 101, 102, and 103. The PRB[0] and PRB[1] dedicated to base station 100 are allocated to the respective UEs 101 and 102, and the PRB[7] used in common with the neighbor base stations is allocated to the UE 103 located far from base station 200. Since the PRB[6] is reported with the DL HII value set to "2" by base station 200, base station 100 discontinues the use of the PRB[6].

Next, base station 100 generates the DL HII messages to be transmitted to the neighbor base station (907). The DL HII messages are generates as described with reference to FIGS. 6a and 6b. According to FIG. 6A, base station 100 performs the first DL HII phase to set the DL HII values of PRB[0], PRB[1], and PRB[7] in use to "1". At this time, base station 100 sets the DL HII values of the rest PRBs to "0". Next, base station 100 performs the second DL HII phase of FIG. 6B to reset the DL HII values of the PRBs which are in use but vulnerable to interference to "2". That is, since the UE 102 is located at the cell boundary between base stations 100 and 200, base station 100 detects the vulnerability of the UE 102 to the interference from base station 200 and thus resets the DL HII value of the PRB[1] allocated to the UE 102 to "2" in the DL HII message for base station 200. Also, since the UE 103 is located at the cell boundary between base stations 100 and 300, base station 100 detects the vulnerability of the UE 103 to the interference from base station 300 and thus resets the DL HII value of the PRB[7] allocated to the UE 103 to "2" in the DL HII message for base station 300.

In this manner, base station 100 generates the DL HII messages for the respective neighbor base stations 200 and 300 as shown in FIG. 7D and transmits the DL HII messages to the corresponding base stations (909).

FIG. 8B illustrates the situation in which base station 100 transmits the DL HII messages to the respective base stations 200 and 300. Although it is depicted that base station 100 begins allocating PRBs after the receipt of the DL HII message from base station 200 and 300 in the drawings for purposes of conciseness, the PRB allocation process can be performed after the previous resource allocation process has been completed.

After the DL HII messages are received from base station 100 (and other neighbor base stations, if any), each of base stations 200 and 300 performs scheduling based on the DL HII messages (S911 and S913). In the resource process, the base station allocates PRBs to the UEs in its cells and transmission power on the individual PRBs.

As aforementioned, the base stations transmit the DL HII messages at a short term interval and perform scheduling based on the DL HII messages, resulting in mitigation of inter-cell interferences.

The DL HII message transmission is preferably adopted for a persistent scheduling service in which a UE is allocated a PRB for a predetermined time duration, since the information is transmitted to the neighbor cells on the transmission resource that is already allocated. In the LTE system, Semi-Persistent Scheduling (SPS) service as a type of the persistent scheduling service is provided for the voice telephony service, and the SPS service allocates the PRB at an interval of 20 ms within the talk spurt period in synchronization with the data transmission interval of the voice codec.

The DL HII message can be used for the SPS service operating at the interval of 20 ms by carrying the time information in the DL HII message. For example, the DL HII message can contain an offset value indicating the time point during 20 ms interval. In order to reduce the traffic amount of the DL HII message, it is possible to concentrate the SPS service at a specific ms within a 20 ms interval. For example, it is possible to expand allocation for the SPS service at $0^{th}$ ms and $10^{th}$ ms to $5^{th}$ ms and $15^{th}$ ms as the SPS service increases. The DL HII message can be used in a dynamic scheduling service by carrying information predicting allocation of the corresponding PRB to one of UEs around a cell for a predetermined duration rather than the PRB allocation information.

With the disclosed method, it is possible to improve the service qualities of the persistent scheduling services by mitigating the inter-cell interference between the persistent scheduling services on the DL. Although the DL HII message disclosed in the present invention is required to be transmitted more frequently than the RNTP message, it is sufficient to adopt the DL HII message to the current systems as compared to the Coordinated Multi-Point transmission/reception technique (CoMP) under discussion in LTE-Advanced.

As described above, the inter-cell interference coordination method of the present invention is capable of dynamically mitigating inter-cell interferences by allowing the adjacent base stations to exchange inter-cell interference indication messages. Also, the inter-cell interference coordination method of the present invention enables each base station to perform scheduling based on the scheduling results of neighbor base stations, resulting in improvement of inter-cell interference canceling effect and system performance.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An inter-cell interference mitigation method for a serving base station a wireless communication system, comprising:
   receiving a power control message from a neighbor base station;
   receiving an incoming interference coordination message from the neighbor base station, the incoming interference coordination message comprising an interference indicator of resource blocks;
   allocating one or more of the resource blocks with transmission power per resource block to a user equipment served by the serving base station based on the power control message and the incoming interference coordination message;
   receiving signal strength information from the user equipment, the signal strength information comprising strength of a signal received by the user equipment from the neighbor base station;
   generating an outgoing interference coordination message for the neighbor base station based on the resource block allocation result and the signal strength information; and
   transmitting the outgoing interference coordination message to the neighbor base station.

2. The inter-cell interference mitigation method of claim 1, wherein generating the outgoing interference coordination message comprises:
   setting an interference indicator of a resource block to a use state when the resource block is used, and setting the interference indicator of the resource block to a non-use state when the resource block is not used;
   comparing the strength of signal on the resource block with a threshold, when the resource block is in the use state; and
   resetting the interference indicator to an interference state when the strength of signal is greater than or equal to the threshold, and maintaining the interference indicator in the use state when the strength of signal is less than the threshold.

3. The inter-cell interference mitigation method of claim 2, wherein allocating the one or more of the resource blocks comprises excluding allocation of at least one resource block having the interference indicator set to the non-use state.

4. The inter-cell interference mitigation method of claim 2, wherein allocating the one or more of the resource blocks comprises assigning at least one resource block dedicated to the serving base station to at least one user equipment located anywhere in a cell, allocating at least one resource block dedicated to the neighbor base station to at least one user equipment located at a center of the cell, and allocating none of the resource blocks having interference indicators set to the interference state.

5. The inter-cell interference mitigation method of claim 2, wherein the power control message is transmitted at a first time interval, and the incoming interference coordination message is transmitted at a second time interval which is shorter than the first time interval.

6. The inter-cell interference mitigation method of claim 5, wherein the outgoing interference coordination message is generated per neighbor base station.

7. An inter-cell interference mitigation apparatus for a wireless communication system, comprising:
a message processor that receives an incoming power control message and an interference coordination message transmitted by a neighbor base station, transmits an outgoing interference coordination message to the neighbor base station, and receives signal strength information from a user equipment, wherein the signal strength information comprises strength of a signal that the user equipment received from the neighbor base station;
an interference processor that extracts an interference indicator from the incoming interference coordination message, wherein the interference indicator corresponds to a respective one of a plurality of resource blocks; and
a scheduler which allocates one or more of the resource blocks to the user equipment in a cell with transmission power per resource block based on the interference indicator and generates the outgoing interference coordination messages based on the resource block allocation result and the signal strength.

8. The inter-cell interference mitigation apparatus of claim 7, wherein the scheduler sets an interference indicator of a resource block to a use state when the resource block is used, sets the resource block to a non-use state when the resource block is not used, compares the strength of signal on the resource block with a threshold when the resource block has the interference indicator in the use state, resets the interference indicator to an interference state when the strength of signal is greater than or equal to the threshold, and maintains the interference indicator in the use state when the strength of signal is less than the threshold.

9. The inter-cell interference mitigation apparatus of claim 8, wherein the scheduler excludes the allocation of resource blocks having interference indicators set to the non-use state.

10. The inter-cell interference mitigation apparatus of claim 8, wherein the scheduler assigns at least one resource block dedicated to the serving base station to at least one user equipment located anywhere in a cell, assigns at least one resource blocks dedicated to the neighbor base station to at least one user equipments located at a center of the cell, and assigns none of the resource blocks having interference indicators set to the interference state.

11. The inter-cell interference mitigation apparatus of claim 8, wherein the power control message is transmitted at a first time interval, and the incoming interference coordination message is transmitted at a second time interval, which is shorter than the first time interval.

12. The inter-cell interference mitigation apparatus of claim 11, wherein the outgoing interference coordination message is generated per neighbor base station.

13. An inter-cell interference mitigation method for a wireless communication system, comprising the steps of:
receiving, at a serving base station, power control messages transmitted by neighbor base stations;
receiving, by the serving base station, incoming interference coordination messages transmitted by the neighbor base stations, wherein each of the incoming interference coordination messages comprises a plurality of interference indicators, each of the plurality of interference indicators corresponds to a respective one of a plurality of resource blocks, and each of the plurality of interference indicators is set to one of a use state, a non-use state and an interference state;
allocating, by the serving base station, one or more of the plurality of resource blocks with transmission power per resource block to user equipments served by the serving base station based on the power control messages and the incoming interference coordination messages;
generating, by the serving base station, outgoing interference coordination messages for the neighbor base stations based on the resource block allocation result; and
transmitting, by the serving base station, the outgoing interference coordination messages to the neighbor base stations, respectively.

14. An inter-cell interference mitigation apparatus for a wireless communication system, comprising:
a message processor that receives incoming power control messages and incoming interference coordination messages transmitted by neighbor base stations and transmits outgoing interference coordination messages to the neighbor base stations;
an interference processor that extracts interference indicators from the incoming interference coordination messages, wherein each of the interference indicators corresponds to a respective one of a plurality of resource blocks, and each of the interference indicators is set to one of a use state, a non-use state and an interference state; and
a scheduler which allocates one or more of the plurality resource blocks to user equipments in a cell with transmission power per resource block based on the interference indicators and generates the outgoing interference coordination messages.

* * * * *